United States Patent [19]

Roberts et al.

[11] 3,976,604

[45] Aug. 24, 1976

[54] PREPARATION OF ETHYLENIMINE PREPOLYMER

[75] Inventors: Earl J. Roberts; Stanley P. Rowland, both of New Orleans, La.

[73] Assignee: The United States of America as represented by the Secretary of Agriculture, Washington, D.C.

[22] Filed: Jan. 30, 1975

[21] Appl. No.: 545,277

Related U.S. Application Data

[62] Division of Ser. No. 279,919, Aug. 11, 1972, Pat. No. 3,885,069.

[52] U.S. Cl................................ 260/2 EN; 210/36; 210/38 B; 427/390; 427/392; 427/394; 427/396; 427/445
[51] Int. Cl.².................... C02B 1/46; D06M 13/48; D06M 15/12
[58] Field of Search.............. 210/36, 38; 260/2 EN; 427/390, 394, 396, 445, 392

[56] References Cited
UNITED STATES PATENTS

| | | | |
|---|---|---|---|
| 2,272,489 | 2/1942 | Ulrich | 260/2 X |
| 2,656,241 | 10/1953 | Drake et al. | 260/231 X |
| 2,972,606 | 2/1961 | Hartman et al. | 260/231 |
| 3,565,679 | 2/1971 | Strother | 427/390 X |
| 3,671,304 | 6/1972 | Mischutin | 427/390 X |

*Primary Examiner*—Michael R. Lusignan
*Attorney, Agent, or Firm*—M. Howard Silverstein; Salvador J. Cangemi; David G. McConnell

[57] ABSTRACT

An ethylenimine prepolymer has been prepared by mixing certain alkyl halides with ethylenimine in molar ratios of about from 44:1 to 27:1, respectively, and allowing the mixture to stand for not more than about 16 hours.

1 Claim, No Drawings

PREPARATION OF ETHYLENIMINE PREPOLYMER

This is a division of application Ser. No. 279,919 filed Aug. 11, 1972.

This invention relates to chemical treatment of cotton and other fibrous materials. Specifically, this invention relates to the deposition of in situ formed ethylenimine network polymer in fibrous materials. This is accomplished by impregnation of the substrate with ethylenimine prepolymer prepared by reacting ethylenimine with a difunctional or polyfunctional alkyl or aryl halide. The products of the present process normally have a low ion-exchange capacity while having a high capacity for complexing with heavy metals, such as mercury for example.

This invention should be a very useful tool in this era of emphasis on Ecology, its problems and solutions.

The main object of this invention is to provide an improved method for the in situ formation of an ethylenimine network polymer in the interstaces of porous or absorbent materials.

Another object of this invention is to provide an ion-exchange material for acidic substances.

A third object of this invention is to provide a good scavenger of heavy metals to reduce pollution in water.

A fourth object of this invention is to provide a means for imparting a rot and weather resistance to cotton and other cellulose textiles.

THE PRIOR ART

Several researchers have dealt with various organic chemicals to obtain cotton derivatives with suitable ion-exchange capacity. Drake et al. have disclosed (U.S. Pat. No. 2,656,251) the polymerization of ethylenimine with cotton fibers to produce ion-exchange textiles; however, the disadvantage to the Drake process is that the polyethylenimine is not crosslinked nor covalently bonded to the cotton but is believed to be held onto the cotton by hydrogen bonding, since it is slowly lost upon repeated use and regeneration.

More recent investigations have indicated that although amine-containing cottons do have good ion-exchange properties they generally have low capacity. It has also been determined that some amine-containing cotton do form stable complexes with most heavy metals. The chief problem encountered with amine-containing cottons in which the amine bearing groups are covalently linked to the cellulose molecule is the requirement of multiple treatments in order to be able to attain a sufficiently high degree of add-on. It has been found necessary to crosslink the cotton first to prevent solubilization and dispersion of the cellulose at high levels of add-on.

An equation which can be used to illustrate an applicable case with reference to the chemistry of the present invention is the case where ethylenimine is reacted with 1,2-dichloroethane, thusly:

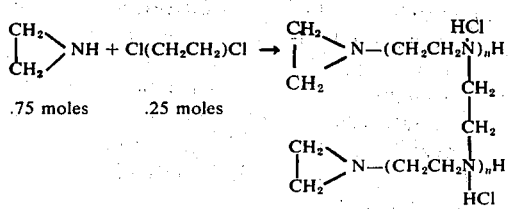

A variety of di- and polyhalogenated organic compounds, other than that illustrated by the use of 1,2-dichloroethane, have been employed in the investigative work which led to the process of this invention, as initiators and crosslinking agents in the polymerization of ethylenimine. The polymerization of ethylenimine must be conducted cautiously with efficient removal of heat to avoid violent and possibly explosive reactions. Polymerization conducted as disclosed in this specification can proceed without incident.

When the prepolymer is allowed to age at room temperature curing occurs and is complete within about 16 hours; however, solutions of the prepolymer in ethanol or water are stable for several days. Curing begins when the solvent is allowed to evaporate.

With respect to preparation of cotton fabric containing crosslinked polyethylenimine formed in situ the add-on is controlled by the concentration of prepolymer in the pad bath. Add-ons of 50% were achieved readily in the process of investigation. Little or no grafting or crosslinking of the cellulose occurred during curing, as evidenced by the solubility of the cellulose in a standard Cuene solution (coppri-ethylenediamine hydroxide). The ethylenimine network polymer was insoluble in the Cuene and remained visible after the cellulose had dissolved. The polymer is apparently held onto the cotton cellulose by virtue of its insolubility and by hydrogen-bonding and entanglement with the cotton fibers.

When the crosslinked polymer is prepared separately it is clear, firm and flexible, it can be broken readily, and is insoluble in water, acids, and strong solutions of base as well as in all organic solvents tested. Under certain conditions the polymer alone will disintegrate to a coarse insoluble powder. The extent of this effect decreases with age of the polymer.

The ion-exchange and complexing capacities of fabric impregnated with the polymer to several levels of add-on are presented in tabulated form to point out the most serviceable facets of the invention; however, a more complete report can be obtained in a paper by these inventors which appeared in Textile Research Journal in October 1971, bearing the title "Ion-Exchange and Complexing Properties of Cotton Fabric Containing Ethylenimine Network Polymer Formed in situ." (see Vol. 41, pp 864–867).

The impregnated fabrics have shown a high capacity for complexing certain heavy metals. Of special interest is the capacity of impregnated fabric to complex mercury, since mercury is one of the more undesirable contaminants in water. It has been visualized that these fibrous materials can well serve to remove many irritants from the air upon being used as filtering devices. Exploratory investigations indicate further value of the fibrous materials prepared by the process of this invention, i.e. rot and mildew resistance can be imparted by the implementation of the process.

The following examples are presented to illustrate some of the preferred embodiments of this invention and should not be construed as limiting the invention in any manner whatever.

EXAMPLE 1

Eight different samples for the formation of the prepolymer are shown in the following table (Table 1). The proportion of halide to ethylenimine may be varied as desired but the most useful and easily controlled molar proportion is that set forth in Sample 5. The temperature in all cases must be controlled within the range of about 10° to 50°C in order to prevent the reaction from becoming violent. When the prepolymer is formed (in about 16 hours when the temperature is kept at about 25°C) it is ready for use in preparing padding solutions. When the prepolymer is dissolved in a solent such as alcohol or water it is tabled for several days but when applied to fabric and the solvent is allowed to evaporate a polymer network is formed within the cotton or other fibrous structure to which it is applied.

TABLE I

PREPOLYMER FORMULATIONS[1]

| Sample | HALIDE Compound | Formula | wt. g | moles | ETHYLENIMINE wt. g | moles |
|---|---|---|---|---|---|---|
| 1 | 1,2-dichloroethane | $ClCH_2OH_2Cl$ | 5 | 0.05 | 95 | 2.20 |
| 2 | 1,2-dichloroethane | $ClCH_2OH_2Cl$ | 25 | 0.25 | 75 | 1.75 |
| 3 | Tris(2-chloroethyl)phosphoramide | $O=P-(NHCH_2CH_2Cl)_3$ | 20 | 0.70 | 80 | 1.86 |
| 4 | Bis(2-chloroethylvinyl)phosphonate | $CH_2=CHP(OCH_2CH_2Cl)_2$ with =O | 25 | 0.10 | 75 | 1.74 |
| 5 | Tris(2,3-dibromopropyl)phosphate | $O_{32}P-(OCH_2CH_2CH_2Br)_3$ | 20 | 0.03 | 90 | 2.00 |
| 6 | Tris(1,3-dichloroisopropyl)phosphate | $O=P-(OCH_2CH_2CH_2Cl)_3$ | 20 | 0.04 | 80 | 1.86 |
| 7 | B,B'-dichloroethyl ether | $ClCH_2OH_2OCH_2CH_2Cl$ | 20 | 0.14 | 80 | 1.86 |
| 8 | Dichloromethane | $CH_2Cl_2$ | 10 | 0.12 | 90 | 2.00 |

Time for prepolymer to be formed: 2 to 16 hours
Temp: 25°C
Prepolymer Solvents: MeOH, EtOH, Prof-OH, $H_2O$, DMF, etc.
[1]This table only shows the halides that were tested as initiaters for prepolymer preparation and crosslinking of ethylenimine.

EXAMPLE 2

PREPARATION OF THE PREPOLYMER (using 1,2-dichloroethane): A mixture 25 parts by weight of initiator and crosslinking agent 1,2-dichloroethane and 75 parts by weight ethylenimine was prepared and set aside in a stoppered flask to prevent evaporation of both volatile components, for about 16 hours at a temperature of 25°C The partial polymerization which occurred during this time manifested itself by a gradual increase in viscosity of the mixture. The mixture at this point is referred to as a "prepolymer." The prepolymer was poured into a shallow dish and allowed to cure upon standing another 16 hours but this time in an open vessel, since no significant vaporization was observed. The shallow dish had been previously coated with silicone grease to insure non-adhesion. At the end of the second 16 hours period a clear, solid polymer was formed and behaved in the manner referred to as "cheesy."

EXAMPLE 3

PREPARATION OF THE POLYMER (using Tris (2-chloroethyl)phosphoramide): To illustrate the preparation of the prepolymer, employing tris(2-chloroethyl)phosphoramide as initiator and crosslinking agent, a mixture 20 parts by weight of tris(2-chloroethyl)phosphoramide and 80 parts by weight of ethylenimine was prepared and set aside, and handled in the same manner as that of Example 2, obtaining substantially the same results.

EXAMPLE 4

IMPREGNATION OF COTTON SUBSTRATE (to produce in situ formed ethylenimine network polymer, employing ethanol solvent): A swatch of cotton printcloth weighing 17.8 grams was treated with a 5% w/w solution of the propolymer of Example 2 in ethanol, to a wet pickup of 100%. The wet impregnated fabric was hung on a line and left unmolested at room temperature (25°C) for 16 hours. It was then washed in flowing tap water for about 30 minutes and again hung to dry for another 16 hours at room temperature. When the fabric was removed from the drying line it was dry and it was evaluated for weight gain and nitrogen content. The weight gain (add-on) was 5% and the nitrogen content was 1.6%.

EXAMPLE 5

IMPREGNATION OF COTTON SUBSTRATE (to produce in situ formed ethylenimine network polymer, employing water solvent): Repeating the processing of Example 4 and employing the same quantities and values therein, it was observed that the results were identical, when water was used as a solvent.

EXAMPLE 6

IMPREGNATION OF COTTON SUBSTRATE (to produce in situ formed ethylenimine network polymer employing tris(2-chloroethyl)phosphoramide with ethanol as solvent): A swatch of cotton printcloth weighing 17.6 grams was treated with a 15% w/w ethanolic solution of prepolymer which was prepared as described in Example 3. The wet pickup was 115%. The wet impregnated fabric was hung on a line and left unmolested at room temperature (25°C) for 16 hours. It was then washed in flowing distilled water for about 30 minutes and again hung to dry for another 16 hours at room temperature. When the fabric was removed from the drying line it was dry. It was then evaluated for weight gain, nitrogen and phosphorus content, and overall appearance. The weight gain (add-on) was 15.8%. The nitrogen content was 3.62% and the phosphorus content was 0.32%.

EXAMPLE 7

USE OF POLYMER AS SCAVENGER

Copper forms a complex with the network polymer which was formed in situ in the structure of cotton fabric.

The network polymer formed in situ in cotton in Example 4 was soaked for 1 hour in a 2.0% w/w solution of cupric sulfate pentahydrate, the fabric then was removed from the solution and washed free of the non-combined cupric sulfate with flowing distilled water. The washed fabric was allowed to air dry at room temperature and chemically analyzed. Copper content was 1.55%.

EXAMPLE 8

USE OF POLYMER AS SCAVENGER

Mercury forms a complex with the network polymer which was formed in situ in the structure of cotton fabric.

The network polymer formed in situ by the process of Example 4 was soaked for 1 hour in a 2.0% w/w solution of mercuric chloride. The fabric was then removed from the solution and washed with flowing distilled water. The washed fabric was allowed to air dry at room temperature and chemically analyzed. The mercury content was 3.45%.

EXAMPLE 9

USE OF POLYMER AS SCAVENGER

Mercury complexed with a network polymer which was formed

The process of Example 8 was employed with the fabric of Example 6. The finished fabric contained 3.71% mercury.

EXAMPLE 10

USE OF POROUS PAPER AS A SUBSTRATE

A porous paper towel was processed in the same manner and using the same chemical mixture of Example 2. The add-on was 48%, after washing, and the nitrogen content was 7.29%.

EXAMPLE 11

USE OF PEANUT SHELLS AS SUBSTRATE

A quantity of peanut shells was ground to pass a 20 mesh screen and 26 grams were impregnated by soaking in a 20% solution of the prepolymer of Example 2. The shells were collected on a sintered glass filter and air was pulled through until the wet pickup was 100%. The wet impregnated peanut shells were then allowed to dry in an open dish for 16 hours at 25°C and suspended in water, then collected on a filter and washed with distilled water 10 times. The shells were then allowed to air dry and then evaluated. The add-on was 38% and the nitrogen content was 5.25%.

We claim:
1. A method for producing an ethylenimine prepolymer, the method comprising:
   a. mixing ethylenimine with an alkyl halide selected from the group consisting of 1,2-dichloroethane, tris(2-chloroethyl)phosphoramide, bis(2-chloroethylvinyl)-phosphonate, tris(2,3-dibromopropyl)-phosphate, tris(1,3-dichloroisopropyl)phosphate, B,B'-dichloroethyl ether and dichloromethane in a molar ratio of about from 44:1 to 27:1; and
   b. allowing the mixture to stand at 10° to 50°C for from 2 to 16 hours.

* * * * *